(12) United States Patent
Huang et al.

(10) Patent No.: US 12,160,912 B2
(45) Date of Patent: Dec. 3, 2024

(54) BLUETOOTH COMMUNICATION METHOD, DEVICE AND SYSTEM

(71) Applicant: Shanghai Mountain View Silicon Co., Ltd., Shanghai (CN)

(72) Inventors: Qin Huang, Shanghai (CN); Huifang Shi, Shanghai (CN); Jingou Xu, Shanghai (CN)

(73) Assignee: Shanghai Mountain View Silicon Co., Ltd., Shanghai (CN)

( * ) Notice: Subject to any disclaimer, the term of this patent is extended or adjusted under 35 U.S.C. 154(b) by 0 days.

(21) Appl. No.: 18/682,110

(22) PCT Filed: Jun. 24, 2022

(86) PCT No.: PCT/CN2022/101053
§ 371 (c)(1),
(2) Date: Feb. 7, 2024

(87) PCT Pub. No.: WO2023/045454
PCT Pub. Date: Mar. 30, 2023

(65) Prior Publication Data
US 2024/0267966 A1    Aug. 8, 2024

(30) Foreign Application Priority Data

Sep. 23, 2021  (CN) .......................... 202111113226.9

(51) Int. Cl.
*H04W 4/00* (2018.01)
*H04L 5/00* (2006.01)
(Continued)

(52) U.S. Cl.
CPC ........... *H04W 76/14* (2018.02); *H04L 5/0048* (2013.01); *H04W 28/06* (2013.01); *H04W 28/0975* (2020.05)

(58) Field of Classification Search
CPC . H04W 76/14; H04W 26/0975; H04W 28/06; H04L 5/0048
(Continued)

(56) References Cited

U.S. PATENT DOCUMENTS 8,711,656 B1 * 4/2014 Paulson ................... H04L 27/10
367/135
11,049,502 B1 * 6/2021 Cheng ..................... G10L 15/26
(Continued)

FOREIGN PATENT DOCUMENTS

CN         103532936 A      1/2014
CN         104660308        5/2015
(Continued)

*Primary Examiner* — Marceau Milord
(74) *Attorney, Agent, or Firm* — IPRTOP LLC

(57) ABSTRACT

A Bluetooth communication method, a Bluetooth communication device, and a Bluetooth communication system are provided. The Bluetooth communication method comprises: segmenting a first signal data and performing a compression-encoding to construct a plurality of first signal data packets; constructing a plurality of first-standard Bluetooth packets, and detecting whether one of the plurality of first-standard Bluetooth packets is a command Bluetooth packet. If the first-standard Bluetooth packet is the command Bluetooth packet, transmitting the first-standard Bluetooth packet directly, and if not, replacing a valid information in the first-standard Bluetooth packet with one corresponding first signal data packet which is in the same data transmitting window as the first-standard Bluetooth packet for transmitting. A second terminal of the point-to-point link obtains the corresponding first signal data by decoding the first-standard Bluetooth packet. The above method can improve the transmission efficiency of signal data and reduce communication delay.

16 Claims, 9 Drawing Sheets

(51) Int. Cl.
*H04W 28/06* (2009.01)
*H04W 28/08* (2023.01)
*H04W 76/14* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 11,145,309 | B1* | 10/2021 | Yang | G10L 25/78 |
| 11,709,708 | B2* | 7/2023 | Zhao | H04W 84/18 |
| | | | | 718/104 |
| 11,803,340 | B2* | 10/2023 | Tsuchiya | H04W 76/14 |
| 11,937,059 | B2* | 3/2024 | Wang | H04R 1/1041 |
| 11,937,200 | B2* | 3/2024 | Li | H04W 56/005 |
| 12,035,275 | B2* | 7/2024 | Alpert | H04W 4/23 |
| 2009/0034498 | A1* | 2/2009 | Banerjea | H04W 76/15 |
| | | | | 455/41.2 |
| 2009/0180451 | A1* | 7/2009 | Alpert | H04W 72/1215 |
| | | | | 370/338 |
| 2011/0051642 | A1* | 3/2011 | Krishnaswamy | H04W 40/10 |
| | | | | 370/389 |
| 2012/0180102 | A1* | 7/2012 | Fan | H04N 21/435 |
| | | | | 725/151 |
| 2013/0260686 | A1* | 10/2013 | Mukherjee | H04W 72/0446 |
| | | | | 455/41.2 |
| 2014/0004798 | A1* | 1/2014 | Yang | H04W 4/80 |
| | | | | 455/41.2 |
| 2016/0249356 | A1* | 8/2016 | Pope | H04W 52/0216 |
| 2016/0309485 | A1* | 10/2016 | Yoon | H04W 76/15 |
| 2021/0045191 | A1* | 2/2021 | Hsieh | H04L 65/1069 |
| 2021/0160673 | A1 | 5/2021 | Girardier et al. | |
| 2021/0400389 | A1* | 12/2021 | Li | H04W 4/80 |
| 2023/0070546 | A1* | 3/2023 | Mosby | G06F 21/566 |
| 2023/0074888 | A1* | 3/2023 | Liu | H04B 1/713 |

FOREIGN PATENT DOCUMENTS

| | | |
|---|---|---|
| CN | 104661172 | 5/2015 |
| CN | 104661172 A | 5/2015 |
| CN | 107959553 A | 4/2018 |
| CN | 111901730 A | 11/2020 |
| CN | 113423093 A | 9/2021 |
| CN | 113873486 | 12/2021 |
| CN | 114025430 | 2/2022 |

* cited by examiner

Segmenting a first signal data based on a length of a first time slice and performing a compression-encoding based on a customized packaging rule to construct a plurality of first signal data packets, wherein each of the plurality of first signal data packets has a corresponding data transmitting window — S11

Constructing, based on the standard Bluetooth protocol, a plurality of first-standard Bluetooth packets through the master device — S12

Transmitting one of the plurality of first-standard Bluetooth packets after performing a detecting and packet-replacing process thereon, so that the slave device obtains corresponding first signal data based on the first-standard Bluetooth packet received from the master device — S13

FIG. 1

Segmenting the first signal data based on a length of a first time slice and performing a compression-encoding based on a customized packaging rule through the master device to construct a plurality of first signal data packets, and segmenting the second signal data based on a length of a second time slice and performing the compression-encoding based on the customized packaging rule through the slave device to construct a plurality of second signal data packets, wherein each of the plurality of first signal data packets has a corresponding first data transmitting window and each of the plurality of second signal data packets has a corresponding second data transmitting window — S21

Constructing, based on the standard Bluetooth protocol, one of a plurality of first-standard Bluetooth packets in one first data transmitting window and transmitting the first-standard Bluetooth packet after performing a detecting and packet-replacing process thereon, so that the slave device obtains a first signal data based on a first signal data packet packaged in the first-standard Bluetooth packet received from the master device; and constructing, based on the standard Bluetooth protocol, one of a plurality of second-standard Bluetooth packets in one second data transmitting window after receiving the first-standard Bluetooth packet, transmitting the second-standard Bluetooth packet after performing the detecting and packet-replacing process thereon, so that the master device obtains the second signal data based on a second signal data packet packaged in the second-standard Bluetooth packet received from the slave device — S23

FIG. 5

BLUETOOTH COMMUNICATION METHOD, DEVICE AND SYSTEM

FIELD OF THE INVENTION

The present disclosure relates to the technical field of wireless communication, in particular to a Bluetooth communication method, a Bluetooth communication device, and a Bluetooth communication system.

BACKGROUND OF THE INVENTION

Bluetooth communication technology has become one of the most important wireless communication methods, with advantages such as low power consumption and long communication distance. However, existing Bluetooth communication technologies typically have a certain delay of several tens of milliseconds or even more than 100 milliseconds in the signal interaction process. Therefore, they cannot meet the real-time and low latency signal transmission requirements of audio and video communication applications. This is especially true for wireless audio applications that require audio and video synchronization, such as wireless microphones for karaoke and gaming headsets.

In view of high latency in existing Bluetooth communication, many low-latency audio interaction schemes have been proposed. However, these schemes include wireless control methods/systems that are often developed and adapted for one specific application scenario, which are not compatible with commonly used standard Bluetooth protocols and other general protocols. These developed wireless control methods/systems have insufficient compatibility, narrow application range, inability to connect and communicate with Bluetooth devices under different control methods/systems, as well as high development costs and long development cycles.

SUMMARY OF THE INVENTION

The present disclosure provides a Bluetooth communication method, a Bluetooth communication device, and a Bluetooth communication system.

A first aspect of the present disclosure provides a Bluetooth communication method, comprising: segmenting a first signal data and performing a compression-encoding to construct a plurality of first signal data packets, wherein each of the plurality of first signal data packets has a corresponding data transmitting window; constructing a plurality of first-standard Bluetooth packets, wherein a length of valid information in each of the plurality of first-standard Bluetooth packets is greater than or equal to a size of each of the plurality of first signal data packets; and detecting whether each of the plurality of first-standard Bluetooth packets is a command Bluetooth packet respectively, if yes, transmitting the first-standard Bluetooth packet directly, and if not, replacing the valid information in the first-standard Bluetooth packet with one corresponding first signal data packet which is in the same data transmitting window as the first-standard Bluetooth packet for transmitting.

In an embodiment of the present disclosure, the replacing of the valid information in the first-standard Bluetooth packet with the corresponding first signal data packet which is in the same data transmitting window as the first-standard Bluetooth packet comprises: replacing all or part of content of a packet header (or, PH) and/or a PDU in the first-standard Bluetooth packet with the corresponding first signal data packet which is in the same data transmitting window as the first-standard Bluetooth packet, when the first-standard Bluetooth packet is a classic Bluetooth packet; or replacing all or part of content of a header, a payload, a CRC and a MIC in the first-standard Bluetooth packet with the corresponding first signal data packet which is in the same data transmitting window as the first-standard Bluetooth packet, when the first-standard Bluetooth packet is a low-power-consumption Bluetooth packet.

In an embodiment of the present disclosure, the constructing of the plurality of first signal data packets comprises: constructing, in one data transmitting window, one first signal data packet corresponding to the data transmitting window based on a package unit of first signal data packet which is disposed independently.

In an embodiment of the present disclosure, the constructing of the plurality of first-standard Bluetooth packets comprises: constructing one of the plurality of first-standard Bluetooth packets for one data transmitting window.

In an embodiment of the present disclosure, an information data used for constructing the plurality of first-standard Bluetooth packets is in a form of an array to be loaded, and wherein the constructing of the plurality of first-standard Bluetooth packets comprises: inputting the information data in the array, and ensuring a depth of the array greater than a payload of each of the plurality of first-standard Bluetooth packets at any time.

In an embodiment of the present disclosure, the Bluetooth communication method further comprises: reducing a transmission frequency of a plurality of command Bluetooth packets in the link while constructing the plurality of first-standard Bluetooth packets.

In an embodiment of the present disclosure, the Bluetooth communication method further comprises: storing, if part of the plurality of first-standard Bluetooth packets are detected to be command Bluetooth packets, one or more unsent first signal data packets until a none-command Bluetooth packet is detected, and performing a re-transmission process on the unsent first signal data packets.

In an embodiment of the present disclosure, the performing of the re-transmission process on the unsent first signal data packets comprises: superimposing the unsent first signal data packets that have not been transmitted before a current data transmitting window into the first signal data corresponding to the current data transmitting window to form a new first signal data that corresponds to the current data transmitting window; re-constructing a new first signal data packet based on the new first signal data; and transmitting the new first signal data packet.

In an embodiment of the present disclosure, the performing of the re-transmission process on the unsent first signal data packets comprises: determining, based on a size of the unsent first signal data packets and the number of data transmitting windows for re-transmission, an amount of one new first signal data corresponding to one of the data transmitting windows for re-transmission; superimposing the unsent first signal data packets into the first signal data corresponding to a current data transmitting window for re-transmission to form a superimposed first signal data; extracting front-segment data in the superimposed first signal data based on the amount of the new first signal data, enabling the front-segment data to be the new first signal data corresponding to the current data transmitting window, re-constructing a new first signal data packet based on the new first signal data, and transmitting the new first signal data packet; and enabling remaining-segment data in the superimposed first signal data other than the front-segment data to be a new unsent first signal data packet, and sequentially performing the re-transmission process in the following data transmitting windows for re-transmission until all unsent first signal data packets are transmitted.

In an embodiment of the present disclosure, the re-constructing of the new first signal data packet based on the new first signal data comprises: superimposing the unsent first signal data packets that have not been transmitted before the current data transmitting window into the first signal data corresponding to the current data transmitting window to form the new first signal data; determining whether the amount of the new first signal data is greater than a length of the valid information of the first-standard Bluetooth packet corresponding to the current data transmitting window, if yes, obtaining the new first signal data packet based on an original data compression rate; and if not, adjusting the original data compression rate to obtain a new data compression rate, and compressing the new first signal data based on the new data compression rate to obtain the new first signal data packet.

A second aspect of the present disclosure provides another Bluetooth communication method used for a first terminal of a point-to-point link with bidirectional communication, comprising: receiving a plurality of first-standard Bluetooth packets transmitted by a second terminal of the link, wherein a valid information in each of the plurality of first-standard Bluetooth packets comprises a first signal data packet; analyzing the plurality of first-standard Bluetooth packets to obtain a plurality of first signal data packets, wherein each of the plurality of first-standard Bluetooth packets has one corresponding first signal data packet; decoding each of the plurality of first signal data packets to obtain a corresponding first signal data.

In an embodiment of the present disclosure, the Bluetooth communication method further comprises: segmenting a second signal data and performing a compression-encoding to construct a plurality of second signal data packets, wherein each of the plurality of second signal data packets has a corresponding second data transmitting window; constructing a plurality of second-standard Bluetooth packets, wherein a length of valid information in each of the plurality of second-standard Bluetooth packets is greater than or equal to a size of each of the plurality of second signal data packets; detecting whether one of the plurality of second-standard Bluetooth packets is a command Bluetooth packet respectively, if yes, transmitting the second-standard Bluetooth packet directly, and if not, replacing the valid information in the second-standard Bluetooth packet with one corresponding second signal data packet which is in the same second data transmitting window as the second-standard Bluetooth packet.

In an embodiment of the present disclosure, the Bluetooth communication method further comprises: performing a resending detection on the first signal data packet in one of the plurality of first-standard Bluetooth packets transmitted by the second terminal of the link to obtain a detection result indicating whether the first signal data packet needs to be re-sent, and adding the detection result into a corresponding second signal data packet, so that the second terminal determines whether or not to re-send the first signal data packet based on the detection result.

A third aspect of the present disclosure provides a Bluetooth communication device used for a point-to-point link, comprising: a package unit of signal data, used for segmenting a first signal data and performing a compression-encoding to construct a plurality of first signal data packets and transmitting each of the plurality of first signal data packets to a packet replace unit, wherein each of the plurality of first signal data packets has a corresponding data transmitting window; a package unit of standard Bluetooth packet, used for constructing a plurality of first-standard Bluetooth packets and transmitting each of the plurality of first-standard Bluetooth packets to the packet replace unit, wherein a length of valid information in each of the plurality of first-standard Bluetooth packets is greater than or equal to a size of each of the plurality of first signal data packets; the packet replace unit, used for detecting whether one of the plurality of first-standard Bluetooth packets is a command Bluetooth packet, if yes, transmitting the first-standard Bluetooth packet to a transmitting unit directly, and if not, replacing the valid information in the first-standard Bluetooth packet with one corresponding first signal data packet which is in the same data transmitting window as the first-standard Bluetooth packet, and transmitting the replaced first-standard Bluetooth packet to the transmitting unit; the transmitting unit, used for transmitting the plurality of first-standard Bluetooth packets.

In an embodiment of the present disclosure, the Bluetooth communication device further comprises: a package control unit, used for controlling the package unit of standard Bluetooth packet to construct one first-standard Bluetooth packet in each data transmitting window.

In an embodiment of the present disclosure, the Bluetooth communication device further comprises: a superimposing unit of signal data, used for storing, if part of the plurality of first-standard Bluetooth packets are detected to be command Bluetooth packets, one or more unsent first signal data packets until a none-command Bluetooth packet is detected, and performing a re-transmission process on the unsent first signal data packets.

A fourth aspect of the present disclosure provides another Bluetooth communication device used for a point-to-point link, comprising: a receiving unit, used for receiving a plurality of first-standard Bluetooth packets transmitted by a second terminal of the link, wherein a valid information in each of the plurality of first-standard Bluetooth packets comprises a first signal data packet; a decoding unit, used for decoding each of the plurality of first-standard Bluetooth packets to obtain one first signal data packet corresponding to the first-standard Bluetooth packet and decoding the first signal data packet to obtain a first signal data corresponding to the first signal data packet.

In an embodiment of the present disclosure, the Bluetooth communication device further comprises: a package unit of signal data, used for segmenting a second signal data and performing a compression-encoding to construct a plurality of second signal data packets and transmitting each of the plurality of second signal data packets to a packet replace unit, wherein each of the plurality of second signal data packets has a corresponding second data transmitting window; a package unit of standard Bluetooth packet, used for constructing a plurality of second-standard Bluetooth packets and transmitting each of the plurality of second-standard Bluetooth packets to the packet replace unit, wherein a length of valid information in each of the plurality of second-standard Bluetooth packets is greater than or equal to a size of each of the plurality of second signal data packets; the packet replace unit, used for detecting whether each of the plurality of second-standard Bluetooth packets is a command Bluetooth packet, if yes, transmitting the second-standard Bluetooth packet to a transmitting unit directly, and if not, replacing the valid information in the second-standard Bluetooth packet with one corresponding second signal data packet which is in the same second data transmitting window as the second-standard Bluetooth packet, and transmitting the replaced second-standard Bluetooth packet to the transmitting unit; the transmitting unit, used for transmitting the plurality of second-standard Bluetooth packets.

In an embodiment of the present disclosure, the Bluetooth communication device further comprises: a package control unit, used for controlling the package unit of standard Bluetooth packet to construct one second-standard Bluetooth packet in each second data transmitting window; and a re-sending detection unit, used for performing a resending detection on the first signal data packet in one of the plurality of first-standard Bluetooth packets to obtain a detection result, and adding the detection result into a corresponding second signal data packet, so that the second terminal determines whether or not to re-send the first signal data packet based on the detection result.

A fifth aspect of the present disclosure provides a Bluetooth communication system, comprising: a first collection device, used for collecting a first signal data and transmitting the first signal data to a first Bluetooth communication device; a second collection device, used for collecting a second signal data and transmitting the second signal data to a second Bluetooth communication device; the first Bluetooth communication device, configured to be the Bluetooth communication device according to the third aspect of the present disclosure, and to be used for transmitting the first signal data to the second Bluetooth communication device; and the second Bluetooth communication device, configured to be the Bluetooth communication device according to the fourth aspect of the present disclosure, and to be used for transmitting the second signal data to the first Bluetooth communication device.

As described above, the present disclosure constructs the received signal data into a plurality of signal data packets and replaces the valid information in one of the plurality of standard Bluetooth packets with one corresponding signal data packet which is in the same data transmitting window as the standard Bluetooth packet for transmitting. This allows the receiving terminal to obtain the signal data packet by analyzing the received standard Bluetooth packet and then obtain the signal data by analyzing the signal data packet. This enables more signal data to be loaded into the standard Bluetooth packet, fully utilizing the information-carrying capacity of standard Bluetooth packets, thereby improving the transmission efficiency of signal data and reducing communication delay.

BRIEF DESCRIPTION OF DRAWINGS

FIG. 1 shows a flowchart of a Bluetooth communication method according to an embodiment of the present disclosure.

FIG. 5 shows a flowchart of another Bluetooth communication method according to an embodiment of the present disclosure.

DETAILED DESCRIPTION OF THE INVENTION

Figure 2:
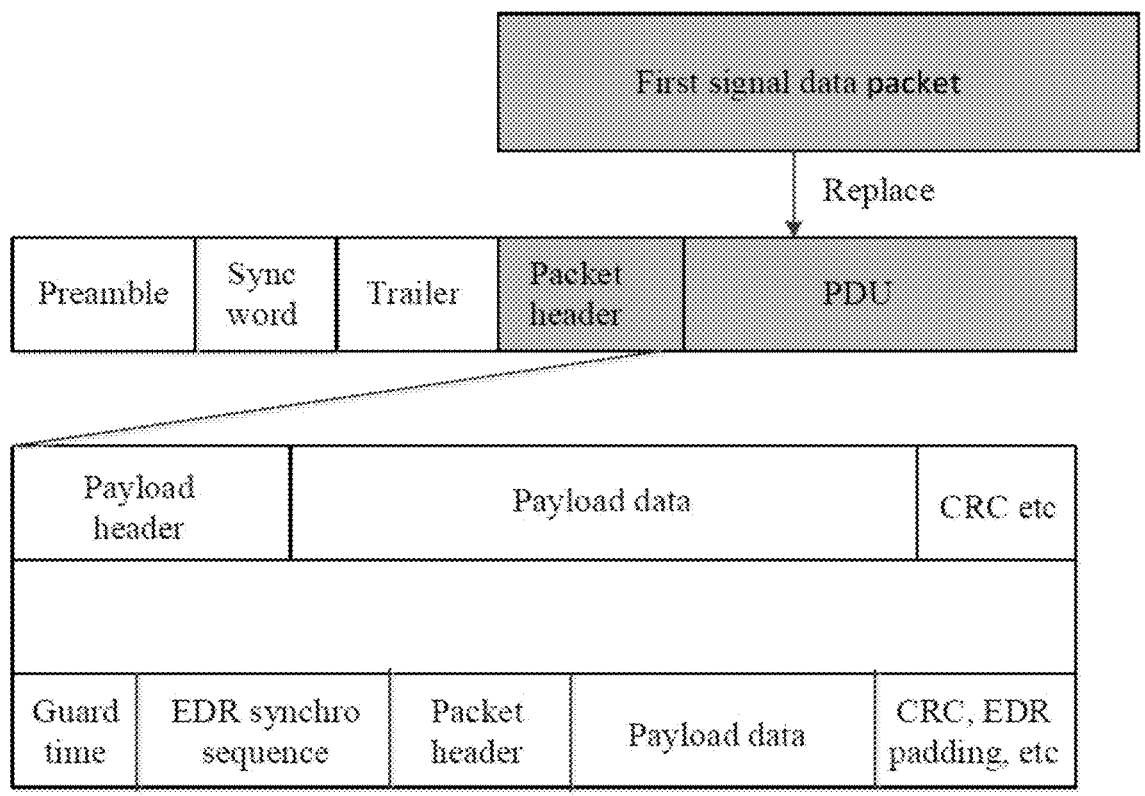
FIG. 2 shows a schematic diagram that illustrates a packet content in one first-standard Bluetooth packet is replaced by one first signal data packet when the first-standard Bluetooth packet is a classic Bluetooth packet.
Figure 3:
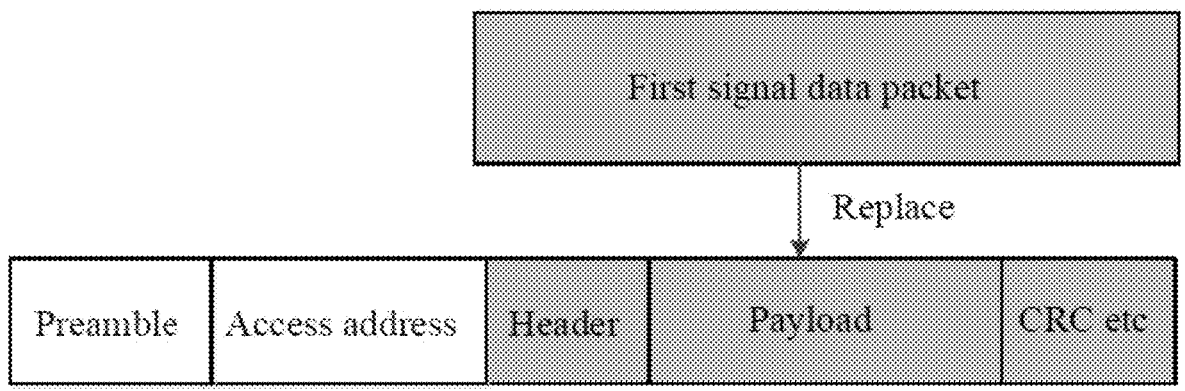
FIG. 3 shows a schematic diagram that illustrates a packet content in one first-standard Bluetooth packet is replaced by one first signal data packet when the first-standard Bluetooth packet is a low-power-consumption Bluetooth packet.

The embodiments of the present disclosure will be described below through the following examples. Those skilled can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure. It should be noted that the following embodiments and the features of the following embodiments can be combined with each other if no conflict occurs.

It should be noted that the drawings provided in the following embodiments only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated.

Embodiment 1

The present disclosure provides a Bluetooth communication method in Embodiment 1. The Bluetooth communication method is used for unidirectional signal data transmission between a Bluetooth master device (hereinafter is referred to as master device) and a Bluetooth slave device (hereinafter is referred to as slave device). Specifically, the signal data is transmitted from the master device to the slave device, or from the slave device to the master device. The signal data includes audio data, video data, or other continuously collected signal data.

A point-to-point link connection is established between the master device and the slave device based on a standard Bluetooth protocol and a customized Bluetooth protocol. Specifically, the customized Bluetooth protocol comprises a customized packaging rule and a customized unpacking rule. The customized packaging rule is used for performing a compression-encoding process on the signal data to be transmitted, so as to form a corresponding packet of the signal data. The customized unpacking rule is used for decoding the packet of the signal data to obtain the corresponding signal data.

FIG. 1 shows a flowchart of a Bluetooth communication method according to an embodiment of the present disclosure, which is applied to the master device. As shown in FIG. 1, the Bluetooth communication method comprises steps S11 to S13.

Step S11: segmenting a first signal data based on a length of a first time slice and performing a compression-encoding based on a customized packaging rule to construct a plurality of first signal data packets, wherein each of the plurality of first signal data packets has a corresponding data transmitting window.

Specifically, the master device segments the first signal data based on the length of the first time slice and performs the compression-encoding on the first signal data, and then forms the first signal data packets arranged in time sequence according to an assembly mode of each part of the signal data packets involved in the customized packaging rule. One of the plurality of the first signal data packets and one data transmitting window are corresponded in time sequence.

Specifically, the first time slice is a collection duration for the first signal data in a single transmission. The first time slice is preset in the customized Bluetooth protocol, and is positively correlated with a communication delay of the link. In other words, the greater the first time slice, the longer the communication delay of the link.

When the master device and the slave device adopt classic Bluetooth transmission, the first time slice includes n slots.

In a specific embodiment, n is two, so as to increase the transmission frequency and reduce signal delay in a single transmission.

In another specific embodiment, n is four or six, so as to increase the bandwidth of signal transmission, thereby increasing a transmission amount of the first signal data per unit of time.

When the master device and the slave device adopt low-power-consumption Bluetooth transmission, the first time slice may be selected as 1.25 ms.

It should be noted that the specific packaging mode involved in the customized packaging rule may be the same as the standard Bluetooth protocol or may be different from the standard Bluetooth protocol.

Step S12: constructing, based on the standard Bluetooth protocol, a plurality of first-standard Bluetooth packets through the master device.

A type of the first-standard Bluetooth packets is preset in the standard Bluetooth protocol based on both a size of one corresponding first signal data packet to be transmitted in a single first time slice and a length of one corresponding data transmitting window. The packet type ensures a length of valid information in the first-standard Bluetooth packet is greater than or equal to a size of the first signal data packet to be transmitted in the single first time slice, so that the first-standard Bluetooth packet can carry the first signal data to be transmitted.

Optionally, the length of the valid information in the first-standard Bluetooth packet is greater than the size of the first signal data packet to be transmitted in the single first time slice, so as to reserve a certain information loading space for executing a resending or re-transmission process on the first signal data packet.

Specifically, based on the length of the first time slice and a collection feature of the signal data, an amount of the first signal data to be transmitted in the single first time slice is determined, and then the type of the standard Bluetooth packet is determined.

In the classic Bluetooth transmission, for example, when a dual-channel audio data is collected in a manner that a collection rate is 48 k and a quantization bit is 16 bit, and the length of the first time slice is two slots and equals 1.25 ms, the amount of the dual-channel audio data to be transmitted in the single first time slice is 1.25*48*16*2=1920 bits. When a preset data compression rate is 4:1, a dual-channel audio data packet is 60 bytes after compressing. When the length of the corresponding data transmitting window is one slot, the dual-channel audio data packet to be transmitted in one corresponding data transmitting window is 60 bytes, thereby the type of the standard Bluetooth packet in the standard Bluetooth protocol is set to be 3DH1 with a length greater than 60 bytes.

In the low-power-consumption Bluetooth transmission, for example, when a dual-channel audio data is collected in a manner that a collection rate is 48 k and a quantization bit is 16 bit, and the length of the first time slice is 1.25 ms, the amount of the dual-channel audio data to be transmitted in the single first time slice is 1.25 ms*48 k*2*16=1920 bits. When a preset data compression rate is 4:1, a dual-channel audio data packet is 60 bytes after compressing. When the length of the corresponding data transmitting window is 475 μs, the type of the standard Bluetooth packet in the standard Bluetooth protocol is set to be BLE 2M with a length greater than 60 bytes.

It should be noted that the standard Bluetooth protocol further includes command Bluetooth packet (such as DM1) for satisfying a link command interaction requirement.

To increase a transmission frequency of the first-standard Bluetooth packets and reduce communication delay, the master device, when connecting to the slave device, constructs and transmits one first-standard Bluetooth packet in each data transmitting window, so as to ensure that both a first-standard Bluetooth packet and a first signal data packet can be transmitted in each data transmitting window.

In a specific embodiment, constructing and transmitting one first-standard Bluetooth packet in each data transmitting window comprises: constructing the first-standard Bluetooth packet through the master device based on information data to be loaded as an array, and generating and inputting the information data into the array. A depth of the array is greater than a payload of each first-standard Bluetooth packet at any time. The information data is any data used for constructing the first-standard Bluetooth packets.

When the master device detects that the depth of the array is greater than the payload of the standard Bluetooth packet, it extracts an information data having the same length as the payload, and packages the information data loaded as the array into the standard Bluetooth packet based on the standard Bluetooth protocol.

Step S13: transmitting one of the plurality of first-standard Bluetooth packets after performing a detecting and packet-replacing process thereon, so that the slave device obtains corresponding first signal data based on the first-standard Bluetooth packet received from the master device.

The detecting and packet-replacing process comprises detecting whether the first-standard Bluetooth packet is a command Bluetooth packet, if yes, transmitting the first-standard Bluetooth packet directly, and if not, replacing the valid information in the first-standard Bluetooth packet with one corresponding first signal data packet which is in the same data transmitting window as the first-standard Bluetooth packet, so as to form a new first-standard Bluetooth packet.

Specifically, the valid information is a part of data in the first-standard Bluetooth packet, packet content of which may be replaced.

In a specific embodiment, replacing all or part of content of a packet header (or, PH) and/or a PDU in the first-standard Bluetooth packet when the first-standard Bluetooth packet is a classic Bluetooth packet, as shown in FIG. 2.

In another specific embodiment, replacing all or part of content of a header, a payload, and a CRC in the first-standard Bluetooth packet when the first-standard Bluetooth packet is a low-power-consumption Bluetooth packet. Optionally, when the low-power-consumption Bluetooth packet further comprises a MIC, replacing all or part of the content of the header, the payload, the CRC, and the MIC.

The master device transmits the new first-standard Bluetooth packet in one data transmitting window, and the slave device receives the new first-standard Bluetooth packet from the master device and obtains the corresponding first signal data packet included in the new first-standard Bluetooth packet. The slave device analyzes the corresponding first signal data packet based on the customized unpacking rule, so as to obtain the corresponding first signal data.

Repeating the above steps to implement the transmission of the signal data.

In one embodiment, in order to reduce the communication delay and avoid the signal transmission quality being affected, when executing step S13, the Bluetooth communication method of the present disclosure further comprises:

transmitting, if multiple first-standard Bluetooth packets are detected to be command Bluetooth packets, these first-standard Bluetooth packets directly and storing one or more unsent first signal data packets until a none-command Bluetooth packet is detected, and performing a re-transmission process on these unsent first signal data packets.

Specifically, performing the re-transmission process on the unsent first signal data packets comprises: superimposing the unsent first signal data packets into first signal data corresponding to a next data transmitting window to form a new first signal data that corresponds to the next data transmitting window, re-constructing a new first signal data packet based on the new first signal data, and transmitting the new first signal data packet.

In a specific embodiment, performing the re-transmission process on the unsent first signal data packets comprises: superimposing the unsent first signal data packets into a first signal data to be transmitted to form a new first signal data; determining whether an amount of the new first signal data is greater than a length of valid information of a corresponding first-standard Bluetooth packet, if yes, obtaining a new first signal data packet based on an original data compression rate; and if not, obtaining a new data compression rate based on the amount of the new first signal data and the length of the valid information in the first-standard Bluetooth packet, which is greater than the original data compression rate; and compressing the new first signal data based on the new data compression rate to obtain the new first signal data packet.

In step S11, the original data compression rate is used for segmenting the first signal data and performing the compression-encoding.

Figure 4:
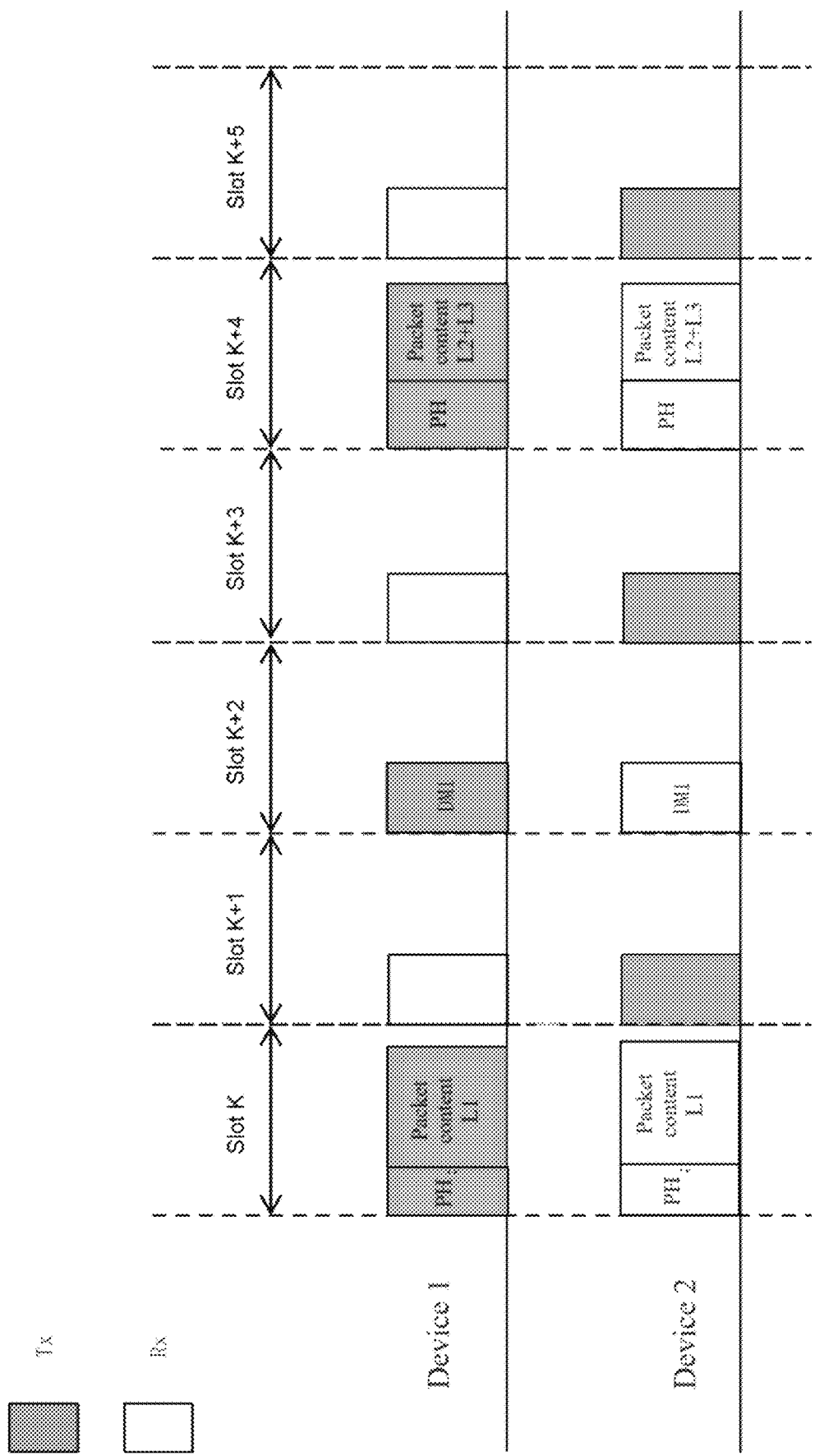
FIG. 4 shows a schematic diagram that illustrates a unidirectional transmission of signal data from a master device to a slave device by using the Bluetooth communication method according to an embodiment of the present disclosure, during which there is a command interaction.

As an example, FIG. 4 shows a schematic diagram that illustrates a command interaction requirement in a link. As shown in FIG. 4, in slot K+2 (which is a data transmitting window), a device 1 transmits a command packet DM1 to a device 2, and do not replace the packet content of the command packet DM1. A first signal data packet L2 which is not transmitted in slot K+2 will be superimposed into a signal data to be transmitted in slot K+4 to form a new signal data corresponding to slot K+4 (which is a data transmitting window). A new data compression rate of the new signal data in slot K+4 can be determined based on the amount of the new signal data and the length of the valid information in the corresponding first-standard Bluetooth packet. The new signal data in slot K+4 is compressed based on the new data compression rate to obtain a new signal data packet. The new signal data packet is transmitted in slot K+4, that is, the valid information in the first-standard Bluetooth packet transmitted from the device 1 to the device 2 is replaced by a packet of L2+L3 in slot K+4.

In another specific embodiment, performing the re-transmission process on the unsent first signal data packets comprises: determining, based on a size (M) of the unsent first signal data packets and the number (N) of data transmitting windows for re-transmission, an amount of the first signal data to be re-sent in each data transmitting window for re-transmission is M/N. Therefore, an amount of a new first signal data corresponding to each data transmitting window for re-transmission is X+M/N, wherein X is an original amount of the first signal data to be re-sent in one data transmitting window. Superimposing the unsent first signal data packets into a first signal data corresponding to a current data transmitting window for re-transmission to form a superimposed first signal data. Extracting front-segment data in the superimposed first signal data based on the amount of the superimposed first signal data to enable the front-segment data to serve as a new first signal data corresponding to the current data transmitting window for re-transmission. Determining whether the amount of the new first signal data is greater than a length of valid information of a corresponding first-standard Bluetooth packet, if yes, obtaining a new first signal data packet based on an original data compression rate; and if not, obtaining a new data compression rate based on the amount of the new first signal data and the length of the valid information in the corresponding first-standard Bluetooth packet, and compressing the new first signal data based on the new data compression rate to obtain a new first signal data packet. Enabling remaining-segment data in the superimposed first signal data other than the front-segment data to serve as a new unsent first signal data, and sequentially performing the re-transmission process in the following data transmitting windows for re-transmission until all unsent first signal data are transmitted. This can help reduce communication delay, and prevent signal data loss and degradation of signal data quality due to excessive data compression.

Specifically, the front-segment data is disposed at a front-end of time sequence of the superimposed first signal data and has an amount of X+m/n.

Optionally, N is not greater than three.

In one embodiment, in order to improve the real-time performance of signal data transmission and reduce communication delay, the master device further comprises a package unit of first signal data packet, which is independent of a package unit of standard Bluetooth packet. The package unit of first signal data packet and the package unit of standard Bluetooth packet may be the same or different. When executing step S11, the Bluetooth communication method of the present disclosure further comprises:

constructing, in one data transmitting window, a first signal data packet corresponding to the data transmitting window through the package unit of first signal data packet based on the customized Bluetooth protocol, so that when one first-standard Bluetooth packet corresponding to the data transmitting window is detected to be a none-command Bluetooth packet, replacing the packet content of the first-standard Bluetooth packet with the first signal data packet constructed in this data transmitting window. In the existing technology, packaging is based on the standard Bluetooth protocol and the traditional package unit of standard Bluetooth packet, which requires the master device to start scheduling preparation at least two slots in advance. While in the present disclosure, the first signal data packet is constructed for the corresponding data transmitting window based on the customized Bluetooth protocol and the package unit of first signal data packet, which avoids communication delay caused by early scheduling and packaging.

In one embodiment, in order to increase a replacing frequency of the packet content in one first-standard Bluetooth packet, improve the real-time performance of signal data transmission, and reduce communication delay, when executing step S12, the Bluetooth communication method of the present disclosure further comprises: reducing a transmission frequency of the command Bluetooth packet in the link to increase a transmission frequency of the none-command Bluetooth packet, replacing the packet content of the first-standard Bluetooth packet, to realize the real-time performance of signal data transmission and the degradation of communication delay.

As an example, the transmission frequency of the command Bluetooth packet in the link is reduced by turning off or reducing adaptive frequency hopping, turning off power control, and other control methods.

It should be noted that, in the Bluetooth communication method, steps S11 to S13 are executed simultaneously in the entire transmission process of the signal data, thereby reducing the delay of signal data in communication transmission. In one embodiment, the steps described above may also be deformed, for example, steps S11 and S12 may be executed synchronously, or step S11 may lag in step S12. It should be noted that the Bluetooth communication method according to the present disclosure is not only applicable to the master device, but also to the slave device. When the slave device executes the Bluetooth communication method and acts as an implementing subject, the slave device is a first device, and the master device is a second device.

Embodiment 2

The present disclosure provides another Bluetooth communication method in Embodiment 2. The Bluetooth communication method is used for bidirectional signal data transmission between a master device and a slave device.

A point-to-point link connection is established between the master device and the slave device based on a standard Bluetooth protocol and a customized Bluetooth protocol. The customized Bluetooth protocol is the same as that of Embodiment 1, which will not be repeated.

The master device transmits a first signal data to the slave device in a first data transmitting window, and the slave device transmits a second signal data to the master device in a second data transmitting window.

FIG. 5 shows a flowchart of another Bluetooth communication method according to an embodiment of the present disclosure. As shown in FIG. 5, the Bluetooth communication method comprises steps S21 to S22.

Step S21: segmenting the first signal data based on a length of a first time slice and performing a compression-encoding based on a customized packaging rule through the master device to construct a plurality of first signal data packets, and segmenting the second signal data based on a length of a second time slice and performing the compression-encoding based on the customized packaging rule through the slave device to construct a plurality of second signal data packets, wherein each of the plurality of first signal data packets has a corresponding first data transmitting window and each of the plurality of second signal data packets has a corresponding second data transmitting window.

Specifically, the first time slice is a collection duration for the first signal data in a single transmission of the master device, and the second time slice is a collection duration for the second signal data in a single transmission of the slave device. The first and second time slices are preset in the customized Bluetooth protocol, and have the same length.

Specifically, when the master device and the slave device adopt classic Bluetooth transmission, the first and second time slices both include n slots, and n may be selected from two, six, and ten.

In a specific embodiment, n is two, so as to increase the transmission frequency and reduce signal delay in a single transmission.

In another specific embodiment, n is six or ten, so as to increase a transmission amount of the signal data in a single transmission.

When the master device and the slave device adopt low-power-consumption Bluetooth transmission, the first and second time slices may be selected as 1.25 ms.

Step S22: constructing, based on the standard Bluetooth protocol, one of a plurality of first-standard Bluetooth packets in one first data transmitting window and transmitting the first-standard Bluetooth packet after performing a detecting and packet-replacing process thereon, so that the slave device obtains a first signal data based on a first signal data packet packaged in the first-standard Bluetooth packet received from the master device; and constructing, based on the standard Bluetooth protocol, one of a plurality of second-standard Bluetooth packets in one second data transmitting window after receiving the first-standard Bluetooth packet, transmitting the second-standard Bluetooth packet after performing the detecting and packet-replacing process thereon, so that the master device obtains the second signal data based on a second signal data packet packaged in the second-standard Bluetooth packet received from the slave device.

Specifically, the implementation method for constructing the first-standard Bluetooth packets in the first data transmitting windows is the same as that of S12 in Embodiment 1, and the implementation method for performing the detecting and packet-replacing process on the first-standard Bluetooth packets is the same as that of S13 in Embodiment 1, both of which will not be repeated.

The slave device receives and analyzes the first-standard Bluetooth packet to obtain the first signal data packet contained in valid information of the first-standard Bluetooth packet. The slave device analyzes the first signal data packet based on the customized unpacking rule to obtain a corresponding first signal data. The slave device constructs, based on the standard Bluetooth protocol, the second-standard Bluetooth packet in the second data transmitting window after receiving the first-standard Bluetooth packet, and transmits the second-standard Bluetooth packet after performing the detecting and packet-replacing process thereon.

The implementation method for constructing one of the plurality of second-standard Bluetooth packets by the slave device is the same as that of constructing one of the plurality of first-standard Bluetooth packets by the master device, and the implementation method for performing the detecting and packet-replacing process on the second-standard Bluetooth packet by the slave device is the same as that of performing the detecting and packet-replacing process on the first-standard Bluetooth packet by the master device. Similarly, in the detecting and packet-replacing process, the slave device detects whether one of the plurality of second-standard Bluetooth packets is a command Bluetooth packet, if yes, transmits the second-standard Bluetooth packet directly, and if not, replaces valid information in the second-standard Bluetooth packet with one corresponding second signal data packet which is in the same data transmitting window as the second-standard Bluetooth packet, so as to form a new second-standard Bluetooth packet.

The master device receives and analyzes the second-standard Bluetooth packet to obtain the second signal data packet packaged in the second-standard Bluetooth packet. The master device analyzes the second signal data packet based on the customized unpacking rule to obtain a corresponding second signal data.

Figure 6:
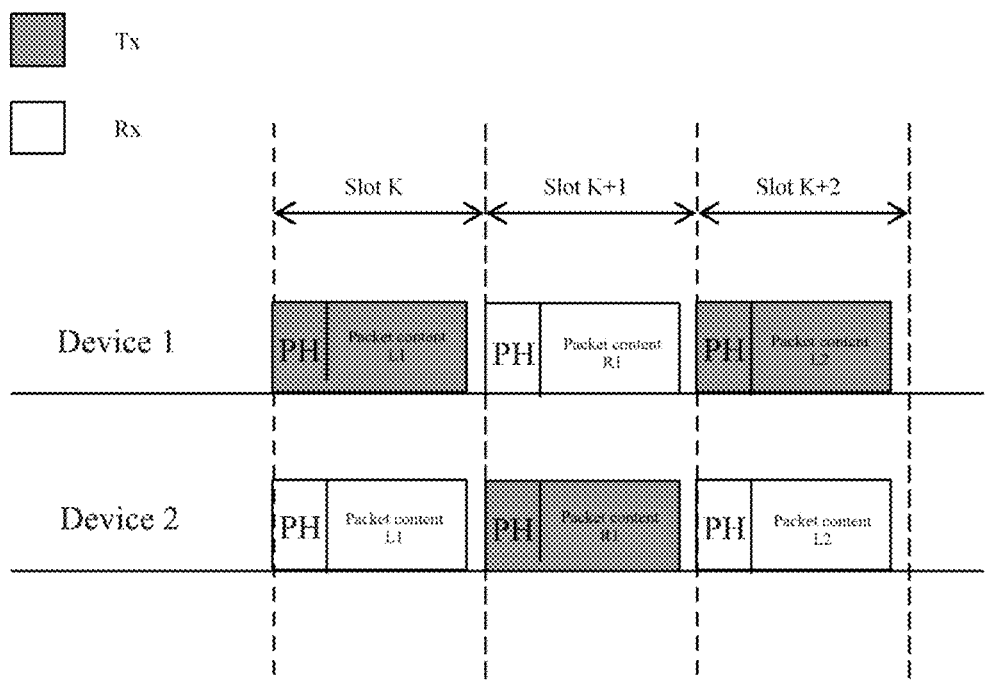
FIG. 6 shows a schematic diagram that illustrates a bidirectional transmission of signal data between a master device and a slave device by using the Bluetooth communication method according to an embodiment of the present disclosure, during which there is no command interaction.

As an example, when there is no command interaction requirement in the link, as shown in FIG. 6, the master device (device 1) transmits a normal data packet 3DH1 to the slave device (device 2) in slot K, and replaces the packet content of 3DH1 with a first signal data packet L1. In slot K+1, the slave device (device 2) replies to the master device (device 1) with 3DH1, and replaces the packet content of 3DH1 with a second signal data packet R1. In slot K+2, the master device (device 1) transmits 3DH1 to the slave device, and replaces the packet content of 3DH1 with a first signal data packet L2. The above process will be repeated in the following slots.

Further, transmitting, if multiple second-standard Bluetooth packets are detected to be command Bluetooth packets, these second-standard Bluetooth packet directly, storing one or more unsent second signal data packets until a none-command Bluetooth packet is detected, and performing the re-transmission process on the unsent second signal data packets. The implementation method for performing the re-transmission process on the unsent second signal data packets is the same as that of performing the re-transmission process on the unsent first signal data packets, which will not be repeated.

Figure 7:
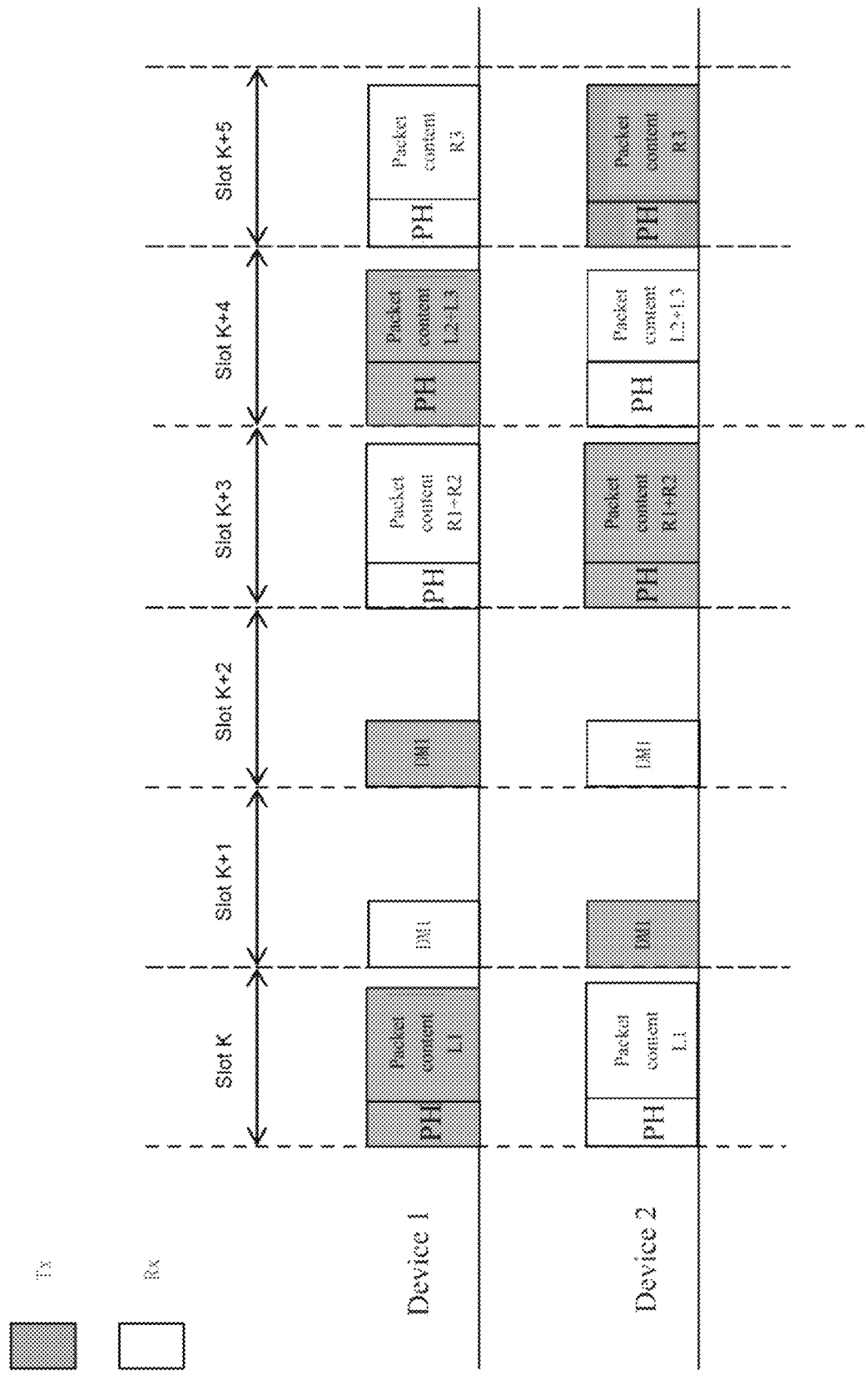
FIG. 7 shows a schematic diagram that illustrates a bidirectional transmission of signal data between a master device and a slave device by using the Bluetooth communication method according to an embodiment of the present disclosure, during which there is a command interaction.

As an example, when there is a command interaction requirement in the link, as shown in FIG. 7, the slave device (device 2) transmits an interaction command packet DM1 to the master device (device 1) in slot K+1, and does not perform a packet-replacing process on the interaction command packet DM1. The slave device stores the second signal data packet R1 that has not been transmitted in slot K+1. In slot K+3, the slave device superimposes the second signal data packet R1 into a second signal data corresponding to slot K+3 to obtain a superimposed second signal data, and compresses the superimposed second signal data based on a new data compression rate to obtain a new second signal data packet R1+R2. In slot K+3, the valid information of the second-standard Bluetooth packet transmitted from the slave device (device 2) to the master device (device 1) is replaced by the new second signal data R1+R2. In slot K+1, the master device (device 1) receives the interaction command packet DM1 transmitted from the slave device (device 2), and in slot K+2, the master device replies to the slave device with the interaction command packet DM1. The master device stores the first signal data packet L2 that has not been transmitted in slot K+2, and performs the re-transmission process on the first signal data packet L2 in slot K+4. That is, in slot K+4, the valid information of the first-standard Bluetooth packet transmitted from the master device (device 1) to the slave device (device 2) is replaced by L2+L3.

In order to improve the real-time performance of signal data transmission and reduce communication delay, the master device comprises a package unit of first signal data packet, and the slave device comprises a package unit of second signal data packet. The package unit of first signal data packet and the package unit of second signal data packet are both independent of a package unit of standard Bluetooth packet. When executing step S21, the Bluetooth communication method of the present disclosure further comprises: constructing, in one first data transmitting window, one of the plurality of first signal data packets corresponding to the first data transmitting window through the package unit of first signal data packet of the master device, and constructing, in one second data transmitting window, one of the plurality of second signal data packets corresponding to the second data transmitting window through the package unit of second signal data packet of the slave device. In the existing technology, packaging is based on the standard Bluetooth protocol and the traditional package unit of standard Bluetooth packet, which requires the master device to start scheduling preparation at least two slots in advance. While in the present disclosure, each signal data packet is constructed for the corresponding data transmitting window based on the customized Bluetooth protocol and the package unit of signal data packet, which avoids communication delay caused by early scheduling and packaging.

It should be noted that the package unit of first signal data packet and the package unit of standard Bluetooth packet, as well as the package unit of second signal data packet and the package unit of standard Bluetooth packet, may be either identical or different.

In one embodiment, in order to increase a replacing frequency of the packet content in one standard Bluetooth packet, improve the real-time performance of signal data transmission, and reduce communication delay, when executing step S22, the Bluetooth communication method of the present disclosure further comprises:

reducing a transmission frequency of the command Bluetooth packet in the link to increase a transmission frequency of the none-command Bluetooth packet, replacing the packet content of the standard Bluetooth packet, to realize the real-time performance of signal data transmission and the degradation of communication delay.

As an example, the transmission frequency of the command Bluetooth packet in the link is reduced by turning off or reducing adaptive frequency hopping, turning off power control, and other control methods.

Embodiment 3

The present disclosure provides another Bluetooth communication method in Embodiment 3. The Bluetooth communication method is used for bidirectional signal data transmission between a master device and a slave device.

The Bluetooth communication method in Embodiment 3 is substantially the same as that in Embodiment 2, except that in Embodiment 3, when executing the bidirectional signal data transmission between the master device and the slave device, that is, when executing step S22 in Embodiment 2, the Bluetooth communication method further comprises: after receiving and decoding one first-standard Bluetooth packet in a first data transmitting window to obtain a first signal data, performing a resending-detection on the first signal data through the slave device to obtain a detection result, and adding the detection result into a second signal data packet corresponding to a second data transmitting window, so that the master device determines, in the second data transmitting window, whether or not to re-send the first signal data packet in a next first data transmitting window based on the detection result obtained by analyzing the second signal data packet; and/or after receiving and decoding one second-standard Bluetooth packet in a second data transmitting window to obtain a second signal data, performing a resending-detection on the second signal data through the master device to obtain a detection result, and adding the detection result into a first signal data packet corresponding to a first data transmitting window, so that the slave device determines, in the first data transmitting window, whether or not to re-send the second signal data packet in a next second data transmitting window based on the detection result obtained by analyzing the first signal data packet.

Specifically, the implementation method for re-sending the first signal data packet is the same as that of performing the re-transmission process on the first signal data packet in Embodiment 2, which will not be repeated.

Specifically, the detection result includes: one that needs to be re-sent or not need to be re-sent.

Figure 8:
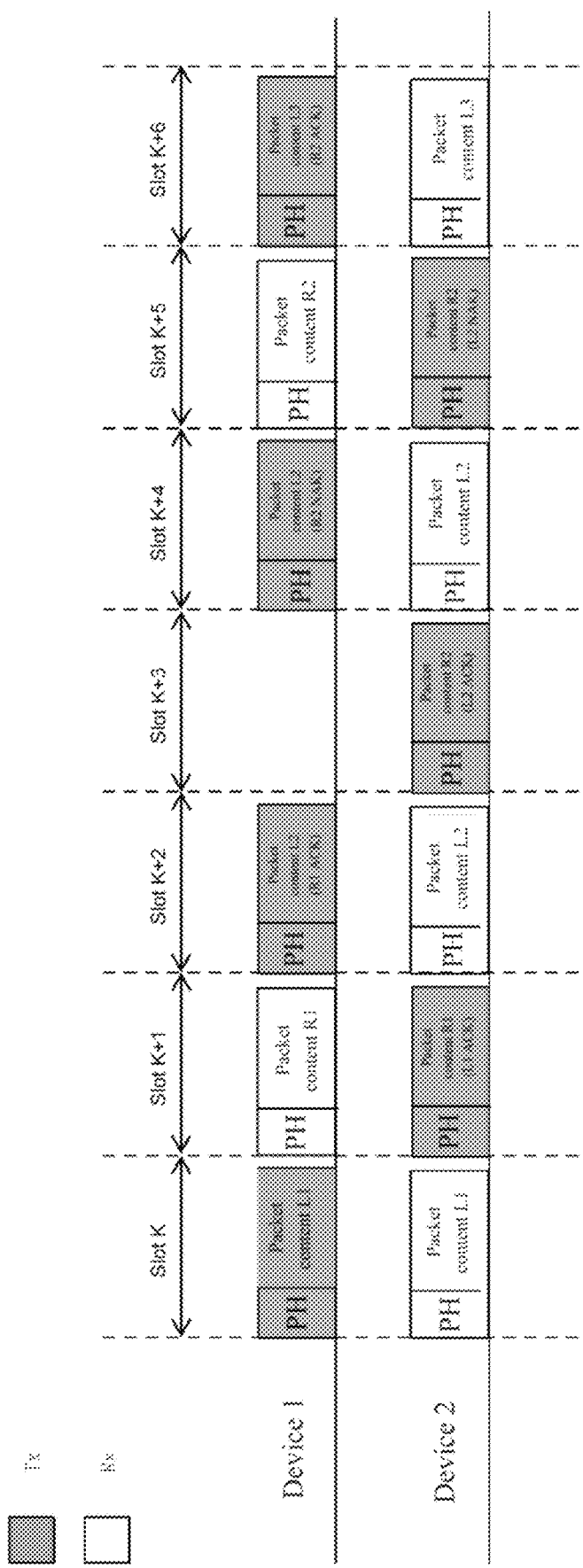
FIG. 8 shows a schematic diagram that illustrates a master-slave device interaction (resending detection) by using the Bluetooth communication method according to an embodiment of the present disclosure.

FIG. 8 shows a schematic diagram that illustrates the master-slave interaction by adopting the Bluetooth communication method according to an embodiment of the present disclosure. The detection result that one needs to be re-sent is represented as NAK, and the detection result that one does not need to be re-sent is represented as ACK.

As shown in FIG. 8, in slot K+1, the slave device (device 2) transmits a second-standard Bluetooth packet R1 to the master device (device 1). The second-standard Bluetooth packet R1 comprises a first detection result that indicates whether a first-standard Bluetooth packet L1 received in slot K by the slave device needs to be re-sent. Here, the first detection result is ACK, which means that the first-standard Bluetooth packet L1 does not need to be re-sent. After receiving and decoding the second-standard Bluetooth packet R1 to obtain the first detection result, the master device (device 1) performs the resending-detection on the second-standard Bluetooth packet R1 to obtain a second detection result, adds the second detection result into a first-standard Bluetooth packet L2, and transmits the first-standard Bluetooth packet L2 to the slave device (device 2) in slot K+2. After receiving and decoding the first-standard Bluetooth packet L2 to obtain the second detection result, the slave device (device 2) performs the resending-detection on the first-standard Bluetooth packet L2 to obtain a new first detection result, and transmits a second-standard Bluetooth packet R2 comprising the new first detection result in slot K+3. In slot K+3, the master device (device 1) loses the second-standard Bluetooth packet R2 transmitted from the slave device (device 2), and in slot K+4, the master device (device 1) transmits a first-standard Bluetooth packet L2 with a first detection result of NAK indicating that the second-standard Bluetooth packet R2 needs to be re-sent. The slave device (device 2) re-transmits the second-standard Bluetooth packet R2 including the second signal data packet in slot K+5, that is, the second-standard Bluetooth packet R2 transmitted by the slave device in slot K+3 is re-transmitted to the master device in slot K+5.

In other embodiments, it should be noted that the Bluetooth communication method comprises another resending-detection with a fixed time of re-sending. Preferably, the times of re-sending is two.

As an example, the master device transmits the same first-standard Bluetooth packet L1 to the slave device in two adjacent first data transmitting windows, such as slots K and K+2. During these two transmissions, the first-standard Bluetooth packet L1 will be adopted as long as it is received correctly at least once. If the first-standard Bluetooth packet L1 fails to be received correctly twice, the first-standard Bluetooth packet L1 will be discarded.

In one embodiment, during the master-slave device interaction, by performing the resending-detection on the standard Bluetooth packets and re-sending the standard Bluetooth packets when needed, the packet loss rate can be reduced and the communication quality can be improved in a high-interference and poor-interaction environment.

Embodiment 4

The present disclosure provides a Bluetooth communication device. The Bluetooth communication device is used for a point-to-point link, and the link is constructed based on a standard Bluetooth protocol and a customized Bluetooth protocol.

Specifically, the customized Bluetooth protocol comprises a customized packaging rule and a customized unpacking rule. The customized packaging rule is used for performing a compression-encoding process on signal data to construct a corresponding signal data packet. The customized unpacking rule is used for decoding the signal data packet to obtain the corresponding signal data.

Figure 9:
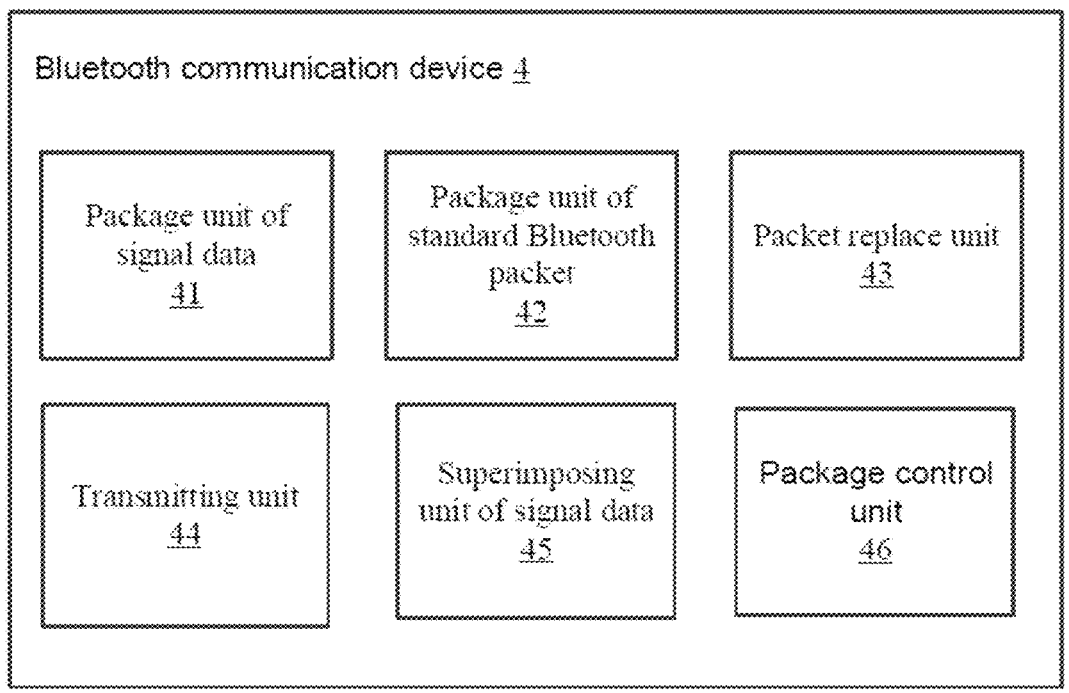
FIG. 9 shows a schematic diagram of a Bluetooth communication device according to an embodiment of the present disclosure.

As shown in FIG. 9, the Bluetooth communication device 4 comprises a package unit of signal data 41, a package unit of standard Bluetooth packet 42, a packet replace unit 43, and a transmitting unit 44.

Specifically, the package unit of signal data 41 is used for segmenting a first signal data based on a preset length of a first time slice and performing a compression-encoding to construct a plurality of first signal data packets, and transmitting each of the plurality of first signal data packets to the packet replace unit 43.

Each of the plurality of first signal data packets has a corresponding data transmitting window.

Furthermore, the package unit of signal data 41 is used for constructing, in one data transmitting window, a first signal data packet corresponding to the data transmitting window. The package unit of standard Bluetooth packet 42 is used for constructing, based on the standard Bluetooth protocol, a plurality of first-standard Bluetooth packets and transmitting each of the plurality of first-standard Bluetooth packets to the packet replace unit 43. A length of valid information in each of the plurality of first-standard Bluetooth packets is greater than or equal to a size of one of the plurality of first signal data packets.

The implementation method for constructing one of the plurality of first-standard Bluetooth packets is the same as that of Embodiment 1, which will not be repeated.

The packet replace unit 43 is used for detecting, in one data transmitting window, whether one of the plurality of first-standard Bluetooth packets is a command Bluetooth packet, if yes, transmitting the first-standard Bluetooth packet to the transmitting unit 44 directly, and if not, replacing the valid information in the first-standard Bluetooth packet with one corresponding first signal data packet which is in the same data transmitting window as the first-standard Bluetooth packet, and transmitting the replaced first-standard Bluetooth packet to the transmitting unit 44.

The transmitting unit 44 is used for transmitting the plurality of first-standard Bluetooth packets.

The Bluetooth communication device further comprises:
a superimposing unit of signal data 45, used for storing, if multiple first-standard Bluetooth packets are detected to be command Bluetooth packets in some first data transmitting windows, one or more unsent first signal data packets until a none-command Bluetooth packet is detected, and performing a re-transmission process on the unsent first signal data packets.

In one embodiment, performing the re-transmission process on the unsent first signal data packets comprises: superimposing the unsent first signal data packets into a first signal data corresponding to a next data transmitting window to form a new first signal data; re-constructing, based on the new first signal data, a new first signal data packet through the package unit of signal data 41.

The above implementation method for superimposing unit of signal data 45 to superimpose the unsent first signal data packets into the first signal data corresponding to the next data transmitting window to form the new first signal data packet is the same as that of Embodiment 1, which will not be repeated.

The Bluetooth communication device further comprises:
a package control unit 46, used for controlling the package unit of standard Bluetooth packet to construct one first-standard Bluetooth packet in each data transmitting window.

In one embodiment, information data used for constructing the first-standard Bluetooth packet is in a form of array, and the information data can be any data. In order to ensure that one first-standard Bluetooth packet is transmitted in each data transmitting window, the package control unit 46 generates and inputs the information data into the array to be loaded, and a depth of the array is greater than a payload of a single first-standard Bluetooth packet at any time, so that the information data can be packaged, based on the standard Bluetooth protocol, to form the first-standard Bluetooth packet by the package unit of standard Bluetooth packet 42. The first-standard Bluetooth packet is transmitted by the transmitting unit 44 to ensure that one first-standard Bluetooth packet is transmitted in each data transmitting window.

In one embodiment, all units of the Bluetooth communication device collaboratively perform the Bluetooth communication method as described above in Embodiment 1, and transmit the first signal data to the second terminal of device of the link by replacing the valid information in the standard Bluetooth packet, thereby improving the real-time performance of signal data transmission and reducing communication delay.

Embodiment 5

The present disclosure provides another Bluetooth communication device in Embodiment 5. The Bluetooth communication device is used for a first terminal of a point-to-point link with bidirectional communication, and the link is constructed based on a standard Bluetooth protocol and a customized Bluetooth protocol.

Specifically, a second terminal of the link transmits a first signal data to the first terminal of the link in one first data transmitting window. The first terminal of the link transmits a second signal data to the second terminal of the link in one second data transmitting window.

Figure 10:
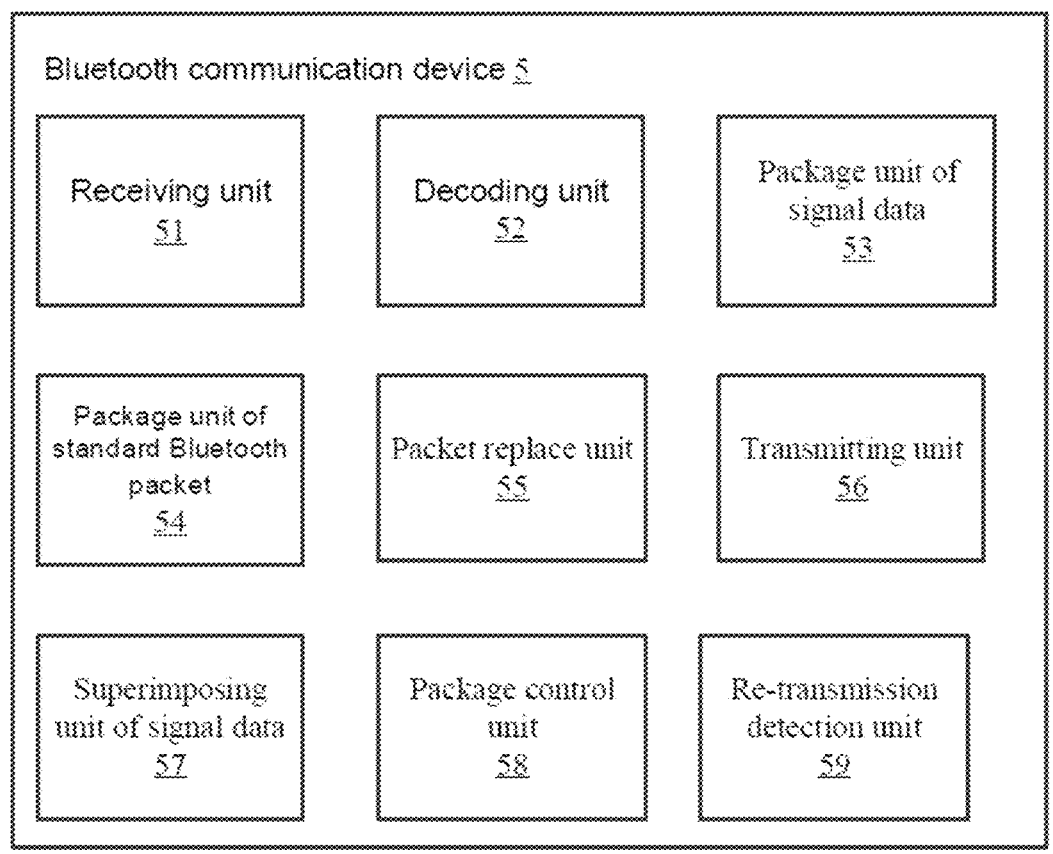
FIG. 10 shows a schematic diagram of another Bluetooth communication device according to an embodiment of the present disclosure.

As shown in FIG. 10, the Bluetooth communication device 5 comprises a receiving unit 51, a decoding unit 52, a package unit of signal data 53, a package unit of standard Bluetooth packet 54, a packet replace unit 55, and a transmitting unit 56.

The receiving unit 51 is used for receiving a plurality of first-standard Bluetooth packets transmitted by the second terminal of the link. The valid information in each of the plurality of first-standard Bluetooth packets comprises a first signal data packet.

In a specific embodiment, one of the plurality of first-standard Bluetooth packets is transmitted in each first data transmitting window through the second terminal of the link. A plurality of first signal data packets are constructed by segmenting the first signal data based on a length of a first time slice and performing a compression-encoding through the second terminal of the link, and each of the plurality of first signal data packets has a corresponding first data transmitting window.

The decoding unit 52 is used for decoding one of the plurality of first-standard Bluetooth packets to obtain a first signal data packet corresponding to the first-standard Bluetooth packet and decoding the first signal data packet to obtain a first signal data corresponding to the first signal data packet.

The package unit of signal data 53 is used for segmenting an input second signal data based on a length of a second time slice, performing a compression-encoding process to construct a plurality of second signal data packets, and transmitting the second signal data packet to the packet replace unit 55.

Specifically, each of the plurality of second signal data packets has a corresponding second data transmitting window. The length of the second time slice equals to the length of the first time slice, which is a base for the second terminal of the link to construct the first signal data packets.

Furthermore, the package unit of signal data 53 is used for constructing, in one second data transmitting window, a second signal data packet corresponding to the second data transmitting window.

The package unit of standard Bluetooth packet 54 is used for constructing, in one second data transmitting window, a second-standard Bluetooth packet based on the standard Bluetooth protocol, and transmitting the second-standard Bluetooth packet to the packet replace unit 55. The length of valid information in each of the plurality of second-standard Bluetooth packets is greater than or equal to a size of one of the plurality of second signal data packets.

The packet replace unit 55 is used for detecting, in one second data transmitting window, whether one of the plurality of second-standard Bluetooth packets is a command Bluetooth packet, if yes, transmitting the second-standard Bluetooth packet to the transmitting unit 56 directly, and if not, replacing the valid information in the second-standard Bluetooth packet with one corresponding second signal data packet which is in the same second data transmitting window as the second-standard Bluetooth packet, and transmitting the replaced second-standard Bluetooth packet to the transmitting unit 56.

The transmitting unit 56 is used for transmitting the plurality of second-standard Bluetooth packets.

The Bluetooth communication device 5 further comprises:

a superimposing unit of signal data 57, used for storing, if multiple second-standard Bluetooth packets are detected to be command Bluetooth packets in some second data transmitting windows, one or more unsent second signal data packets until a none-command Bluetooth packet is detected, and performing a re-transmission process on the unsent second signal data packets.

The implementation method for performing the re-transmission process on the unsent second signal data packets is the same as that of the unsent first signal data packets in Embodiment 4, which will not be repeated.

The Bluetooth communication device further comprises a package control unit 58, used for controlling the package unit of standard Bluetooth packet 53 to construct, based on the standard Bluetooth protocol, one second-standard Bluetooth packet in each second data transmitting window.

In one embodiment, information data used for constructing the second-standard Bluetooth packet is in a form of array, and the information data can be any data. In order to ensure that one second-standard Bluetooth packet is transmitted in each second data transmitting window, the package control unit 58 generates and inputs the information data into the array to be loaded, and a depth of the array is greater than a payload of a single second-standard Bluetooth packet at any time, so that the information data can be packaged, based on the standard Bluetooth protocol, to form the second-standard Bluetooth packet by the package unit of standard Bluetooth packet 53. The second-standard Bluetooth packet is transmitted by the transmitting unit to ensure that one second-standard Bluetooth packet is transmitted in each second data transmitting window.

The Bluetooth communication device further comprises a re-sending detection unit 59, used for receiving and decoding one first-standard Bluetooth packet to obtain a first signal data packet, performing a resending-detection on the first signal data packet to obtain a detection result, and adding the detection result into a second signal data packet corresponding to a second data transmitting window, so that the second terminal of the link determines, based on the detection result obtained by decoding the second signal data packet, whether or not to re-send the first signal data packet in a next first data transmitting window.

The implementation method for the re-sending detection unit is the same as that of Embodiment 3, which will not be repeated.

The implementation method for the re-sending detection unit is the same as that of Embodiment 3, which will not be repeated.

Embodiment 6

The present disclosure provides a Bluetooth communication system used for a point-to-point link with bidirectional communication, and the link is constructed based on a standard Bluetooth protocol and a customized Bluetooth protocol.

Figure 11:
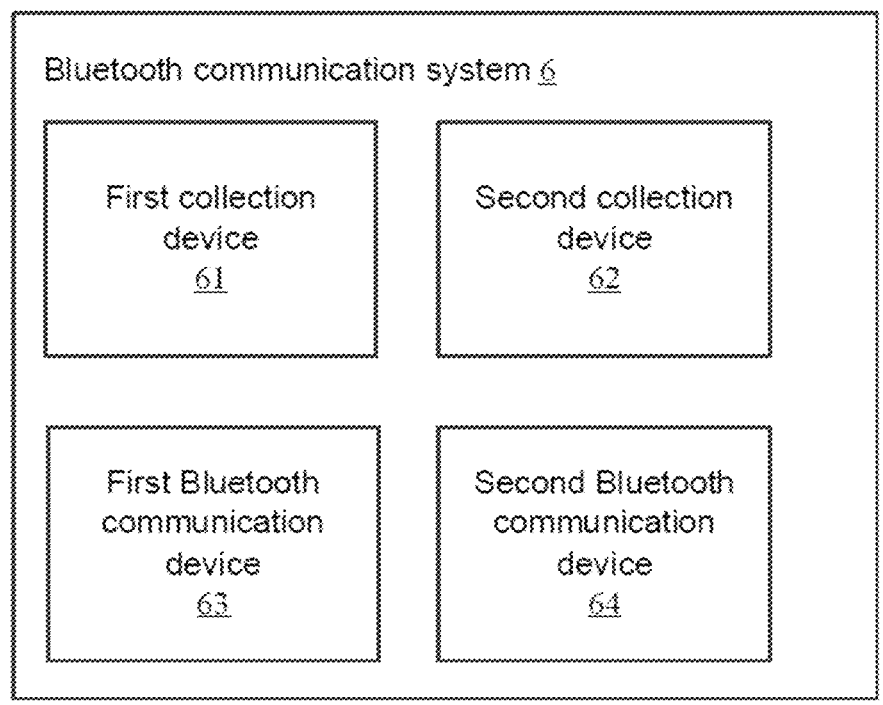
FIG. 11 shows a schematic diagram of a Bluetooth communication system according to an embodiment of the present disclosure.

As shown in FIG. 11, the Bluetooth communication system 6 comprises a first collection device 61, a second collection device 62, a first Bluetooth communication device 63, and a second Bluetooth communication device 64.

Specifically, the first Bluetooth communication device 63 and the second Bluetooth communication device 64 correspond to a master device and a slave device, respectively, and construct the point-to-point link based on the standard Bluetooth protocol and the customized Bluetooth protocol.

The first collection device 61 is connected to the first Bluetooth communication device 63, and is used for collecting a first signal data and outputting the first signal data to the first Bluetooth communication device 63. The second collection device 62 is connected to the second Bluetooth communication device 64, and is used for collecting a second signal data and outputting the second signal data to the second Bluetooth communication device 64. The first signal data and the second signal data may include audio data, video data, or other data that require high real-time transmission.

In a specific embodiment, the first Bluetooth communication device and the second Bluetooth communication device can be a Bluetooth communication device as described in Embodiment 5, so as to realize the interaction therebetween.

In summary, the Bluetooth communication method, the Bluetooth communication device, and the Bluetooth communication system of the present disclosure replace the packet content of one standard Bluetooth packet with signal data, and transmit the replaced standard Bluetooth packet to a receiving terminal, so that the receiving terminal receives and analyzes the replaced standard Bluetooth packet to obtain the signal data, thereby fully utilizing the information-carrying capacity of standard Bluetooth packets for signal data transmission, and reducing communication delay. By directly packaging the signal data through an independent package unit of signal data, the transmission delay of signal data packets caused by conventional Bluetooth scheduling is avoided, thereby further improving signal transmission efficiency and reducing communication delay. In addition, the method of the present disclosure can also fully utilize the existing and widely used standard Bluetooth protocol without establishing a completely new set of Bluetooth protocol. This not only saves development costs and improves development efficiency but also makes the method more adaptable and scalable.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

The invention claimed is:

1. A Bluetooth communication method, used for a first terminal of a point-to-point link, comprising:
   segmenting a first signal data and performing a compression-encoding, to construct, in one data transmitting window, one of a plurality of first signal data packets based on a package unit of first signal data packet which is disposed independently, wherein each of the plurality of first signal data packets has a corresponding data transmitting window;
   constructing, in one data transmitting window, one of a plurality of first-standard Bluetooth packets based on any data, wherein a length of valid information in each of the plurality of first-standard Bluetooth packets is greater than or equal to a size of each of the plurality of first signal data packets;
   detecting whether each of the plurality of first-standard Bluetooth packets is a command Bluetooth packet respectively, if yes, transmitting the first-standard Bluetooth packet directly, and if not, replacing the valid information in the first-standard Bluetooth packet with one corresponding first signal data packet which is in the same data transmitting window as the first-standard Bluetooth packet for transmitting.

2. The Bluetooth communication method according to claim 1, wherein the replacing of the valid information in the first-standard Bluetooth packet with the corresponding first signal data packet which is in the same data transmitting window as the first-standard Bluetooth packet comprises:
  replacing all or part of content of a packet header and/or a PDU in the first-standard Bluetooth packet with the corresponding first signal data packet which is in the same data transmitting window as the first-standard Bluetooth packet, when the first-standard Bluetooth packet is a classic Bluetooth packet; or
  replacing all or part of content of a header, a payload, a CRC and a MIC in the first-standard Bluetooth packet with the corresponding first signal data packet which is in the same data transmitting window as the first-standard Bluetooth packet, when the first-standard Bluetooth packet is a low-power-consumption Bluetooth packet.

3. The Bluetooth communication method according to claim 1, wherein an information data used for constructing the plurality of first-standard Bluetooth packets is in a form of an array to be loaded, and wherein the constructing of the plurality of first-standard Bluetooth packets comprises: inputting the information data in the array, and ensuring a depth of the array greater than a payload of each of the plurality of first-standard Bluetooth packets at any time.

4. The Bluetooth communication method according to claim 1, further comprising: reducing a transmission frequency of a plurality of command Bluetooth packets in the link while constructing the plurality of first-standard Bluetooth packets.

5. The Bluetooth communication method according to claim 1, further comprising: storing, if part of the plurality of first-standard Bluetooth packets are detected to be command Bluetooth packets, one or more unsent first signal data packets until a none-command Bluetooth packet is detected, and performing a re-transmission process on the unsent first signal data packets.

6. The Bluetooth communication method according to claim 5, wherein the performing of the re-transmission process on the unsent first signal data packets comprises: superimposing the unsent first signal data packets that have not been transmitted before a current data transmitting window into the first signal data corresponding to the current data transmitting window to form a new first signal data that corresponds to the current data transmitting window; re-constructing a new first signal data packet based on the new first signal data; and transmitting the new first signal data packet.

7. The Bluetooth communication method according to claim 6, wherein the re-constructing of the new first signal data packet based on the new first signal data comprises:
  superimposing the unsent first signal data packets that have not been transmitted before the current data transmitting window into the first signal data corresponding to the current data transmitting window to form the new first signal data; determining whether the amount of the new first signal data is greater than a length of the valid information of the first-standard Bluetooth packet corresponding to the current data transmitting window, if yes, obtaining the new first signal data packet based on an original data compression rate; and if not, adjusting the original data compression rate to obtain a new data compression rate, and compressing the new first signal data based on the new data compression rate to obtain the new first signal data packet.

8. The Bluetooth communication method according to claim 7, wherein the performing of the re-transmission process on the unsent first signal data packets comprises: determining, based on a size of the unsent first signal data packets and the number of data transmitting windows for re-transmission, an amount of one new first signal data corresponding to one of the data transmitting windows for re-transmission; superimposing the unsent first signal data packets into the first signal data corresponding to a current data transmitting window for re-transmission to form a superimposed first signal data; extracting front-segment data in the superimposed first signal data based on the amount of the new first signal data, enabling the front-segment data to be the new first signal data corresponding to the current data transmitting window, re-constructing a new first signal data packet based on the new first signal data, and transmitting the new first signal data packet; and enabling remaining-segment data in the superimposed first signal data other than the front-segment data to be a new unsent first signal data packet, and sequentially performing the re-transmission process in the following data transmitting windows for re-transmission until all unsent first signal data packets are transmitted.

9. A Bluetooth communication method, used for a first terminal of a point-to-point link with bidirectional communication, comprising:
  receiving a plurality of first-standard Bluetooth packets transmitted by a second terminal of the link, wherein a valid information in each of the plurality of first-standard Bluetooth packets comprises a first signal data packet;
  analyzing the plurality of first-standard Bluetooth packets to obtain a plurality of first signal data packets, wherein each of the plurality of first-standard Bluetooth packets has one corresponding first signal data packet;
  decoding each of the plurality of first signal data packets to obtain a corresponding first signal data;
  segmenting a second signal data and performing a compression-encoding, to construct, in one data transmitting window, one of a plurality of second signal data packets based on a package unit of first signal data packet which is disposed independently, wherein each of the plurality of second signal data packets has a corresponding second data transmitting window;
  constructing, in one data transmitting window, one of a plurality of second-standard Bluetooth packets based on any data, wherein a length of valid information in each of the plurality of second-standard Bluetooth packets is greater than or equal to a size of each of the plurality of second signal data packets;
  detecting whether one of the plurality of second-standard Bluetooth packets is a command Bluetooth packet respectively, if yes, transmitting the second-standard Bluetooth packet directly, and if not, replacing the valid information in the second-standard Bluetooth packet with one corresponding second signal data packet which is in the same second data transmitting window as the second-standard Bluetooth packet.

10. The Bluetooth communication method according to claim 9, further comprising: performing a resending detection on the first signal data packet in one of the plurality of first-standard Bluetooth packets transmitted by the second terminal of the link to obtain a detection result indicating whether the first signal data packet needs to be re-sent, and adding the detection result into a corresponding second signal data packet, so that the second terminal determines whether or not to re-send the first signal data packet based on the detection result.

11. A Bluetooth communication device, used for a point-to-point link, comprising:
   a package unit of signal data, used for segmenting a first signal data and performing a compression-encoding, to construct, in one data transmitting window, one of a plurality of first signal data packets based on a package unit of first signal data packet which is disposed independently, and transmitting each of the plurality of first signal data packets to a packet replace unit, wherein each of the plurality of first signal data packets has a corresponding data transmitting window;
   a package unit of standard Bluetooth packet, used for constructing, in one data transmitting window, one of a plurality of first-standard Bluetooth packets based on any data and transmitting each of the plurality of first-standard Bluetooth packets to the packet replace unit, wherein a length of valid information in each of the plurality of first- standard Bluetooth packets is greater than or equal to a size of each of the plurality of first signal data packets;
   the packet replace unit, used for detecting whether one of the plurality of first-standard Bluetooth packets is a command Bluetooth packet, if yes, transmitting the first-standard Bluetooth packet to a transmitting unit directly, and if not, replacing the valid information in the first-standard Bluetooth packet with one corresponding first signal data packet which is in the same data transmitting window as the first-standard Bluetooth packet, and transmitting the replaced first-standard Bluetooth packet to the transmitting unit; and
   the transmitting unit, used for transmitting the plurality of first-standard Bluetooth packets.

12. The Bluetooth communication device according to claim 11, further comprising:
   a package control unit, used for controlling the package unit of standard Bluetooth packet to construct one first-standard Bluetooth packet in each data transmitting window.

13. The Bluetooth communication device according to claim 11, wherein the packet replace unit further comprises:
   a superimposing unit of signal data, used for storing, if part of the plurality of first-standard Bluetooth packets are detected to be command Bluetooth packets, one or more unsent first signal data packets until a none-command Bluetooth packet is detected, and performing a re-transmission process on the unsent first signal data packets.

14. A Bluetooth communication device, used for a point-to-point link, comprising:
   a receiving unit, used for receiving a plurality of first-standard Bluetooth packets transmitted by a second terminal of the link, wherein a valid information in each of the plurality of first-standard Bluetooth packets comprises a first signal data packet;
   a decoding unit, used for decoding each of the plurality of first-standard Bluetooth packets to obtain one first signal data packet corresponding to the first-standard Bluetooth packet and decoding the first signal data packet to obtain a first signal data corresponding to the first signal data packet;
   a package unit of signal data, used for segmenting a second signal data and performing a compression-encoding to construct, in one data transmitting window, one of a plurality of second signal data packets based on any data and transmitting each of the plurality of second signal data packets to a packet replace unit, wherein each of the plurality of second signal data packets has a corresponding second data transmitting window;
   a package unit of standard Bluetooth packet, used for constructing, in one data transmitting window, one of a plurality of second-standard Bluetooth packets based on any data and transmitting each of the plurality of second-standard Bluetooth packets to the packet replace unit, wherein a length of valid information in each of the plurality of second-standard Bluetooth packets is greater than or equal to a size of each of the plurality of second signal data packets;
   the packet replace unit, used for detecting whether each of the plurality of second-standard Bluetooth packets is a command Bluetooth packet, if yes, transmitting the second-standard Bluetooth packet to a transmitting unit directly, and if not, replacing the valid information in the second-standard Bluetooth packet with one corresponding second signal data packet which is in the same second data transmitting window as the second-standard Bluetooth packet, and transmitting the replaced second-standard Bluetooth packet to the transmitting unit; and
   the transmitting unit, used for transmitting the plurality of second-standard Bluetooth packets.

15. The Bluetooth communication device according to claim 14, further comprising:
   a package control unit, used for controlling the package unit of standard Bluetooth packet to construct one second-standard Bluetooth packet in each second data transmitting window; and
   a re-sending detection unit, used for performing a resending detection on the first signal data packet in one of the plurality of first-standard Bluetooth packets to obtain a detection result, and adding the detection result into a corresponding second signal data packet, so that the second terminal determines whether or not to re-send the first signal data packet based on the detection result.

16. A Bluetooth communication system, comprising:
   a first collection device, used for collecting a first signal data and transmitting the first signal data to a first Bluetooth communication device;
   a second collection device, used for collecting a second signal data and transmitting the second signal data to a second Bluetooth communication device;
   the first Bluetooth communication device, configured to be the Bluetooth communication device according to claim 11, and to be used for transmitting the first signal data to the second Bluetooth communication device; and
   the second Bluetooth communication device, configured to be used for transmitting the second signal data to the first Bluetooth communication device, wherein the second Bluetooth communication device comprises:
   a receiving unit, used for receiving a plurality of first-standard Bluetooth packets transmitted by a second terminal of the link, wherein a valid information in each of the plurality of first-standard Bluetooth packets comprises a first signal data packet;
   a decoding unit, used for decoding each of the plurality of first-standard Bluetooth packets to obtain one first signal data packet corresponding to the first-standard Bluetooth packet and decoding the first signal data packet to obtain a first signal data corresponding to the first signal data packet;

a package unit of signal data, used for segmenting a second signal data and performing a compression-encoding to construct, in one data transmitting window, one of a plurality of second signal data packets based on any data and transmitting each of the plurality of second signal data packets to a packet replace unit, wherein each of the plurality of second signal data packets has a corresponding second data transmitting window;

a package unit of standard Bluetooth packet, used for constructing, in one data transmitting window, one of a plurality of second-standard Bluetooth packets based on any data and transmitting each of the plurality of second-standard Bluetooth packets to the packet replace unit, wherein a length of valid information in each of the plurality of second-standard Bluetooth packets is greater than or equal to a size of each of the plurality of second signal data packets;

the packet replace unit, used for detecting whether each of the plurality of second-standard Bluetooth packets is a command Bluetooth packet, if yes, transmitting the second-standard Bluetooth packet to a transmitting unit directly, and if not, replacing the valid information in the second-standard Bluetooth packet with one corresponding second signal data packet which is in the same second data transmitting window as the second-standard Bluetooth packet, and transmitting the replaced second-standard Bluetooth packet to the transmitting unit; and the transmitting unit, used for transmitting the plurality of second-standard Bluetooth packets.

* * * * *